(12) United States Patent
Milella, Jr. et al.

(10) Patent No.: US 9,676,163 B2
(45) Date of Patent: Jun. 13, 2017

(54) MULTI-PORTION INJECTION MOLDED PART AND METHOD FOR CREATING SAME

(71) Applicant: THERMOFLEX CORPORATION, Waukegan, IL (US)

(72) Inventors: Michael J. Milella, Jr., Richmond, IL (US); David A. Reband, Antioch, IL (US); Karl J. Mazur, Richmond, IL (US); Amanda C. Stingel, Lake Forest, IL (US); Robert A. Price, Glencoe, IL (US)

(73) Assignee: THERMOFLEX CORPORATION, Waukegan, IL (US)

( * ) Notice: Subject to any disclaimer, the term of this patent is extended or adjusted under 35 U.S.C. 154(b) by 0 days.

(21) Appl. No.: 13/679,149

(22) Filed: Nov. 16, 2012

(65) Prior Publication Data
US 2013/0129962 A1   May 23, 2013

Related U.S. Application Data

(60) Provisional application No. 61/562,279, filed on Nov. 21, 2011.

(51) Int. Cl.
| | |
|---|---|
| *B32B 3/24* | (2006.01) |
| *B32B 3/08* | (2006.01) |
| *B32B 7/02* | (2006.01) |
| *B32B 27/08* | (2006.01) |
| *B32B 3/02* | (2006.01) |
| *B32B 3/06* | (2006.01) |

(52) U.S. Cl.
CPC ............ *B32B 3/08* (2013.01); *B32B 3/02* (2013.01); *B32B 3/06* (2013.01); *B32B 7/02* (2013.01); *B32B 27/08* (2013.01); *B32B 2307/734* (2013.01); *Y10T 428/23* (2015.01); *Y10T 428/24339* (2015.01); *Y10T 428/24347* (2015.01)

(58) Field of Classification Search
CPC ............ B32B 3/085; Y10T 428/24339; Y10T 428/24347
USPC .......................... 428/192, 138, 139
See application file for complete search history.

(56) References Cited

U.S. PATENT DOCUMENTS

| | | | | |
|---|---|---|---|---|
| 3,753,846 | A * | 8/1973 | Trouilhet | 30/45 |
| 6,253,527 | B1 * | 7/2001 | De Zen | 52/745.05 |
| 7,291,378 | B2 * | 11/2007 | Cowelchuk et al. | 428/140 |
| 2003/0080474 | A1 * | 5/2003 | Boland et al. | 264/446 |

* cited by examiner

*Primary Examiner* — William P Watkins, III
(74) *Attorney, Agent, or Firm* — Greer, Burns & Crain, Ltd.

(57) ABSTRACT

A plastic injection molded part is provided, including a first portion having a front surface and a rear surface, the front surface including border formations defining a space, and having at least one bleed hole in communication with said rear surface; and a second portion disposed within the space defined by the border formations and including areas filling the at least one bleed hole, such that when the part is formed, molten plastic forming the second portion enters the space through at least one bleed hole.

6 Claims, 7 Drawing Sheets

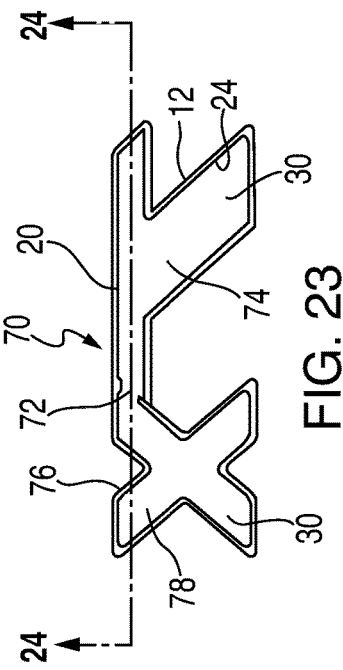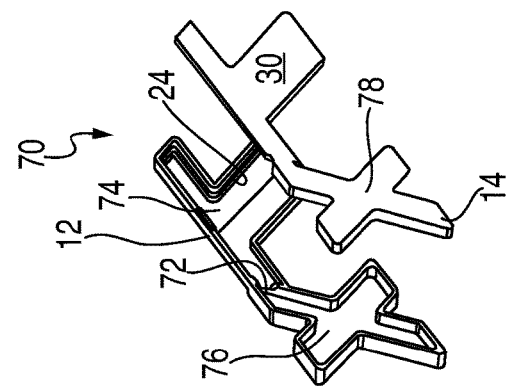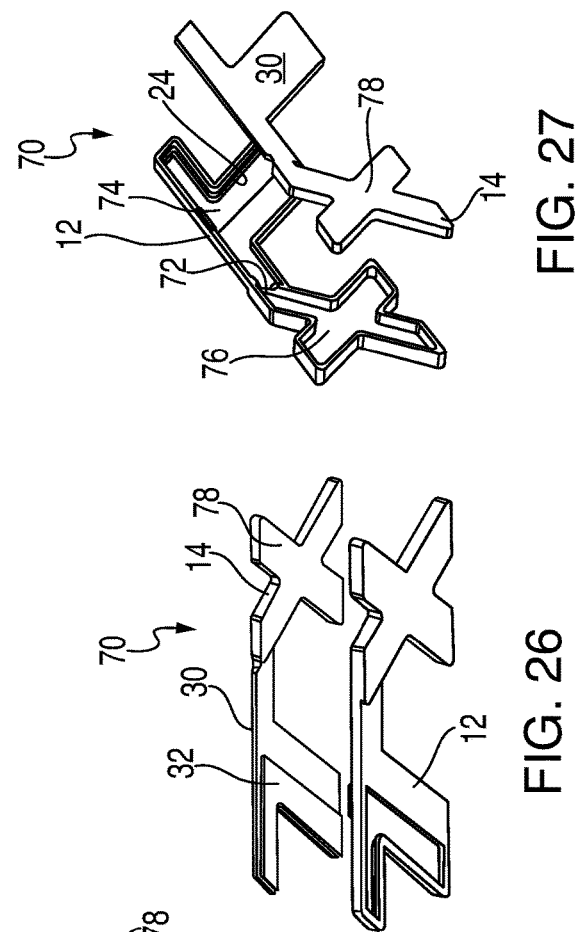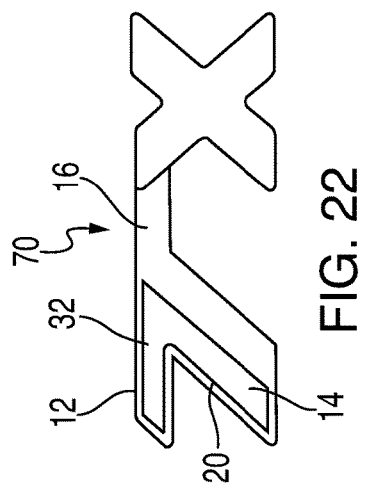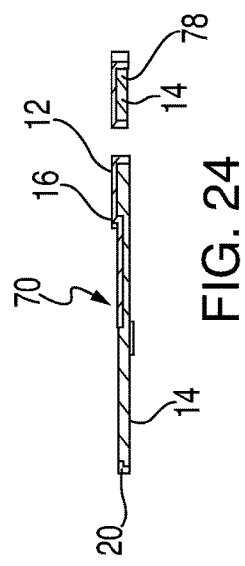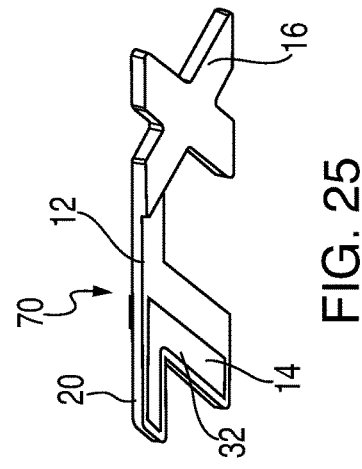

2

MULTI-PORTION INJECTION MOLDED PART AND METHOD FOR CREATING SAME

RELATED APPLICATION

This application claims priority pursuant to 35 USC 119 (e) from U.S. Provisional Application Ser. No. 61/562,279 filed Nov. 21, 2011.

BACKGROUND

The present invention relates generally to plastic parts made by injection molding, and more specifically to such parts having two distinct regions typically delineated by distinct colors or distinct types or grades of plastic, and a method for making same.

It is common in conventional molding technology to produce molded parts having two colors or two types of plastic by a technique referred to as overmolding. First, a base part or frame is produced in a first injection mold, and the resulting base part is designed to have recesses, cavities, channels, etc., referred to as "voids" that will ultimately accommodate the second color and/or grade of plastic. This base part is then placed in a second mold, in which the second color/grade of plastic is injected such that the molten plastic fills the previously created voids.

This type of overmolding is fairly common on many types of consumer products, including tooth brushes, kitchen utensils and grips of hand tools, and achieves satisfactory results. However, when applied to products subjected to more severe operational environments, such as where significant part flexing occurs, it has been found that the parts often separate at the junction of the two types of plastic. Also, in other cases, one of the types of plastic has a relatively larger amount of dimensional instability, causing eventual delamination of the finished part.

SUMMARY

The above-listed needs are met or exceeded by the present multi-portion injection molded part, and method for making same, which features an injection molded part made of two portions, the first forming a border that defines a space for the second portion. In addition, the first portion includes at least one bleed hole on a rear side in communication with the space. When the first portion is molded in a designated first mold and ejected from the mold, the portion includes the at least one bleed hole. Next, the first portion is placed in a second mold, and plastic is injected into a core part of the second mold so that the molten plastic is forced through the at least one bleed hole.

An advantage of this process is that the first portion acts as a border and retainer of the second portion, thus reducing the chances for delamination. In addition, the second portion of the finished part lacks the conventional blemishes and sprue scars found when practicing conventional overmolding techniques. The result is a cleaner, more attractive part because the plastic used to create the second portion is injected through the core rather than the cavity in the second mold, and passes through the at least one bleed hole.

More specifically, a plastic injection molded part is provided, including a first portion having a front surface and a rear surface, the front surface including border formations defining a space, and having at least one bleed hole in communication with the rear surface; and a second portion disposed within the space defined by the border formations and including areas filling the at least one bleed hole, such that when the part is formed, molten plastic forming the second portion enters the space through the at least one bleed hole.

In another embodiment, a method of making a multi part injection molded part is provided, including providing a first mold with a first cavity and a first core, closing and injecting molten plastic into the first mold for forming a first portion with a surface including border formations defining a space, a rear surface and at least one bleed hole in communication with the front and rear surfaces. Next, the first portion is ejected from the first mold. A second mold is provided with a second cavity and a second core. The first portion is placed into the cavity of the second mold, and molten plastic is injected into the second mold through the core such that the plastic flows through the at least one bleed hole to fill the space.

In yet another embodiment, an injection mold is provided, including a cavity with a first part chamber, and a core with a complementary part chamber and at least one bleed hole constructed and arranged so that upon closing of the cavity upon the core, molten plastic is injected into the chamber through the at least one bleed hole.

BRIEF DESCRIPTION OF THE DRAWINGS

FIG. 22 is a front elevation view of another embodiment of the present molded part;

FIG. 23 is a rear elevation view of the part of FIG. 22;

FIG. 24 is a cross-section taken along the line 24-24 of FIG. 23 and in the direction generally indicated;

FIG. 25 is a top perspective view of the part of FIG. 22;

FIG. 26 is an exploded perspective view of a mold used to make the part of FIG. 22 and a part made therefrom; and FIG. 27 is a reverse exploded perspective view of the mold and part of FIG. 26.

DETAILED DESCRIPTION

Figure 1:
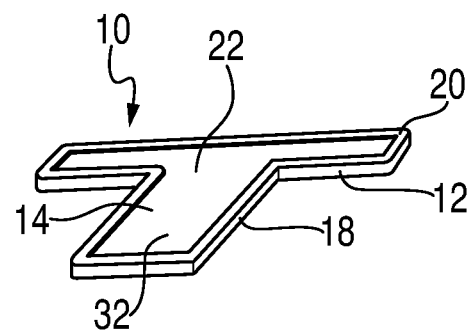
FIG. 1 is a front perspective view of an injection molded part incorporating the present invention.

Referring now to FIGS. 1-6, an injection molded part is generally designated 10, and is preferably made of injection molded plastic, as is known in the art. However, it is also contemplated that the part 10 is only partially made of plastic, the remainder being another material such as metal, ceramic, engineered material or the like. The part 10 includes a first or base portion 12 and a second or insert portion 14. It is contemplated that the first portion 12 is distinct from the second portion 14, such as being made of a distinct material or materials with distinct properties, a distinct color, or combinations of the above. For example, the first portion 12 is optionally made of a plastic that has a Shore hardness and/or color that is distinct from plastic used to make the second portion 14.

Included on the first portion 12 are a first or front surface 16 and a second or rear surface 18, the front surface including at least one border formation 20 defining a space 22. The border formation 20 is contemplated as having a variety of shapes and may be continuous or intermittent. In addition, the border formation 20 retains the second portion 14 within the space 22 in the nature of and providing the function of a retaining wall.

Also provided to the first portion 12 is at least one bleed hole 24 in communication with the rear surface 18. In other words, each bleed hole 24 passes through the first portion 12 so that the front and rear surfaces 16, 18 are in communication with each other. In the preferred embodiment, there are three bleed holes 24, but the number, shape, size and arrangement may vary to suit the application. In some applications, for example relatively smaller molded parts, it is contemplated that the at least one bleed hole 24 is optionally defined by an entire periphery of the first portion 12.

The second portion 14 is disposed within the space 22 defined by the at least one border formation 20 and includes areas filling said at least one bleed port or hole 24, such that when the part 10 is formed, molten plastic forming the second portion 14 enters the space 22 through the at least one bleed hole. As described above, the border formation 20 retains the molten plastic within the space 22 after it enters the bleed holes 24.

Figure 2:
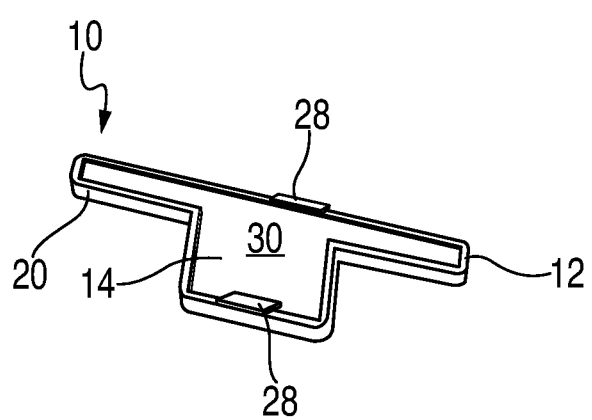
FIG. 2 is a rear perspective view of the part of FIG. 1.
Figure 3:
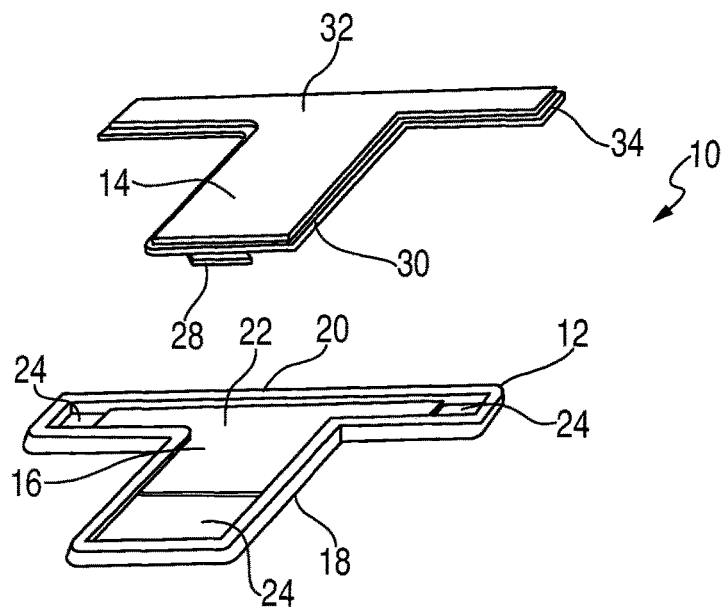
FIG. 3 is an exploded perspective view of the part of FIG. 1.
Figures 4, 6:
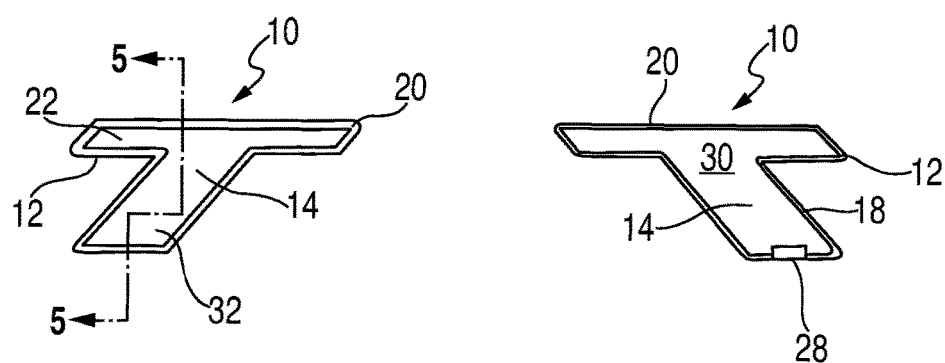
FIG. 4 is a front elevation view of the part of FIG. 1.
FIG. 6 is a rear elevation view of the part of FIG. 4.

Referring now to FIG. 2, a feature of the present part 10 is that a multi-color or distinct two part overmolded effect is achieved, wherein any formation blemishes 28 such as from sprue holes or gates, are found on the rear surface 18 or on a corresponding rear surface 30 of the second portion 14. Thus, the resulting part 10 has a relatively blemish-free front surface 32. As seen in FIG. 3, the second portion 14 is optionally provided with a peripheral shoulder or flange 34 to facilitate a positive engagement between the first and second portions, 12, 14.

Figure 5:
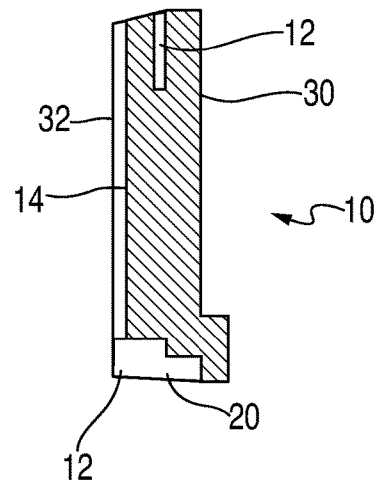
FIG. 5 is a fragmentary cross section taken along the line 5-5 of FIG. 4 and in the direction generally indicated.

Referring now to FIG. 5, it will be seen that, in addition to providing the at least one border formation 20, the first portion 12 serves as a frame or support for the part 10, and provides a substrate to which the second portion 14 adheres.

Figure 7:
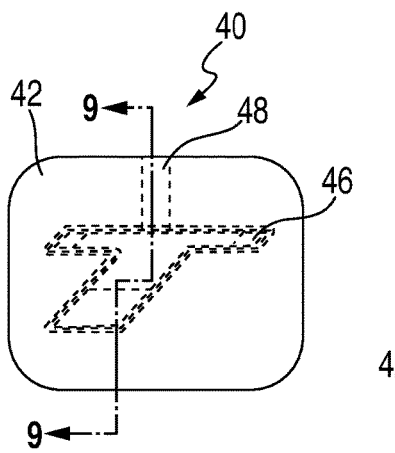
FIG. 7 is a front elevation of a first mold.
Figure 9:
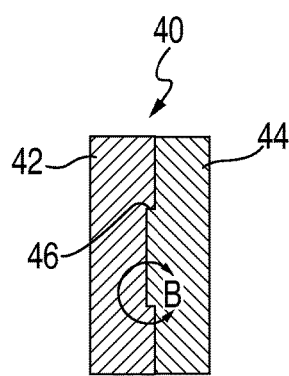
FIG. 9 is a cross-section taken along the line 9-9 of FIG. 7 and in the direction generally indicated.
Figure 8:
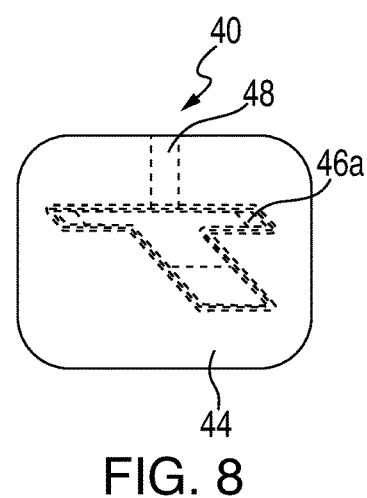
FIG. 8 is a rear elevation of the mold of FIG. 7.

Referring now to FIGS. 7-9, as is common in the injection molding art, a first mold 40 includes a first cavity 42 and a first core 44. The first cavity 42 defines a mold chamber 46 in the shape of the first portion 12 and the first core 44 provides a complementary shape 46a for regulating the flow of molten plastic to obtain the desired configuration when the first mold 40 is closed under pressure, as is well known in the art. Molten plastic is injected through a gate 48 for forming the first portion 12.

Figure 10:
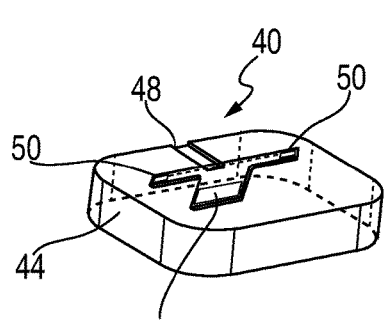
FIG. 10 is a top perspective view of the core portion of the mold of FIG. 7.
Figure 11:
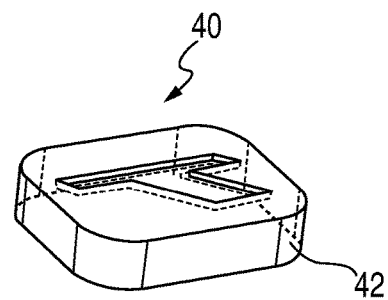
FIG. 11 is a top perspective view of the cavity portion of the mold of FIG. 7.
Figure 12:
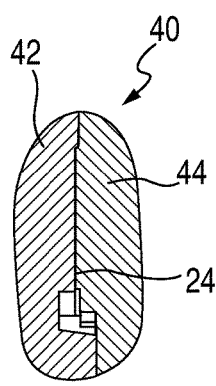
FIG. 12 is an enlarged fragmentary cross-section of the detail area of FIG. 9.
Figure 13:
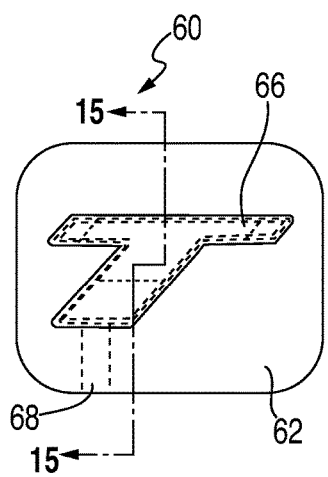
FIG. 13 is a front elevation of a second mold.

Referring now to FIGS. 10-12, the first mold 40 is shown in greater detail, such that the first core 44 is fabricated to have lugs 50 for forming the at least one bleed hole 24. An important feature of the present part 10 is that at least one of the first and second portions 12, 14 are formed by injecting molten plastic through the core 44 instead of the cavity 42, which is the typical practice. This arrangement has been found to enhance the adhesion of the first and second portions 12, 14 to each other, and also to result in a "cleaner" part with formation blemishes located on the rear surfaces 18, 30, since the molten plastic in injected through the rear of the part 10, leaving the front surface relatively clear.

Figure 15:
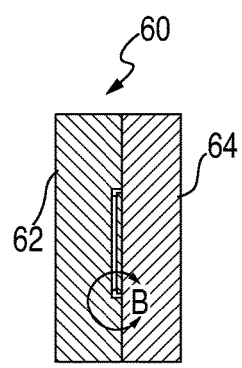
FIG. 15 is a cross-section taken along the line 15-15 of FIG. 13 and in the direction indicated generally.
Figure 14:
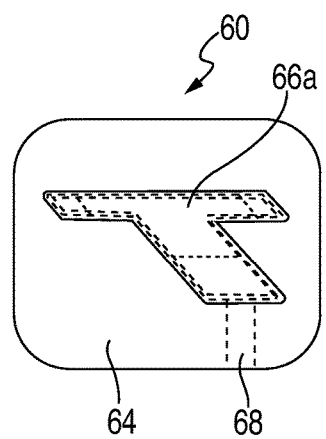
FIG. 14 is a rear elevation of the mold of FIG. 13.
Figure 16:
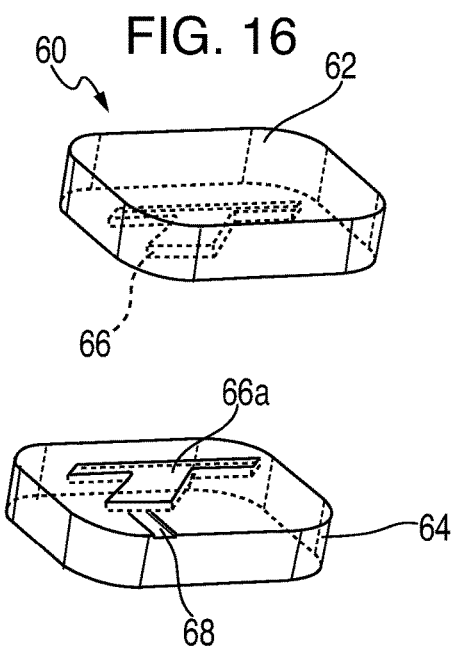
FIG. 16 is an exploded perspective view of the second mold.
Figure 17:
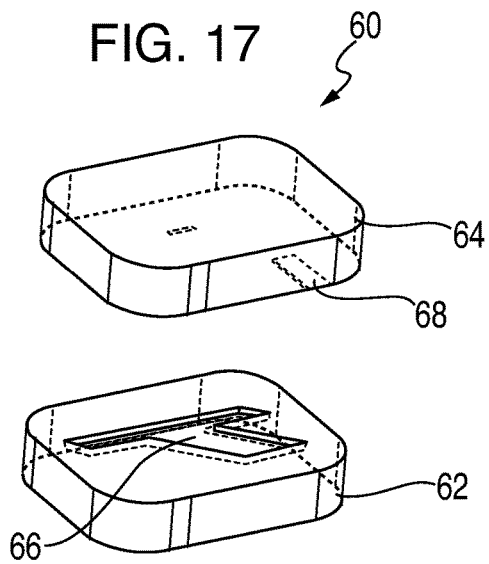
FIG. 17 is an inverted exploded perspective view of the mold of FIG. 16.

Referring now to FIGS. 13-17, a second mold 60 includes a second cavity 62 and a second core 64. As is the case with the first mold 40, the second cavity 62 defines a mold chamber 66, however in this case the chamber is in the combined shape of the first portion 12 and the second portion 14, for creating the finished part 10. The second core 64 provides a complementary shape 66a for regulating the flow of molten plastic to obtain the desired configuration when the first mold 60 is closed under pressure, as is well known in the art (FIG. 15). Also, as is the case with the first mold 40, in the second mold 60, the second core 64 includes at least one gate 68 through which the molten plastic flows under pressure for forming the part. However, in the second mold 60, the molten plastic flows through the gate 68 and also through the bleed holes 24 of the first portion 12 in the mold chamber 66 so that the second portion 14 is formed from the rear surface 18 of the first portion 12.

Figure 18:
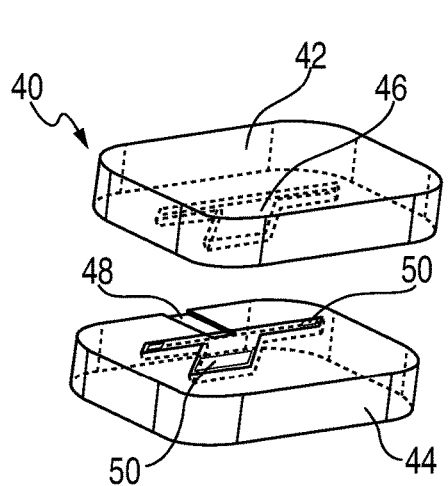
FIG. 18 is an exploded perspective view of the first mold prior to closing and forming a first portion of the part.
Figure 19:
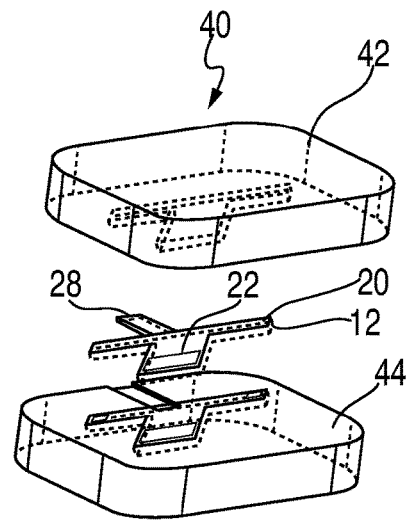
FIG. 19 is an exploded perspective view of the mold of FIG. 18 after the first portion is formed and ejected.

Referring now to FIGS. 18-21, a method of making the multi-part or multi-color injection molded part 10 is disclosed. Initially, the first mold 40 is provided, the first cavity 42 and the first core 44 are pressed together, and molten plastic is injected into the mold chamber 46 under pressure through the gate 48 (FIG. 18). As the first mold 40 cycles, as is known in the art, the first portion 12 is ejected from the opened first mold 40 (FIG. 19). As described above, the first portion 12 is formed with the border formations 20 for defining the space 22, and includes the bleed holes 24 communicating with the front and rear surfaces 16, 18.

Figure 20:
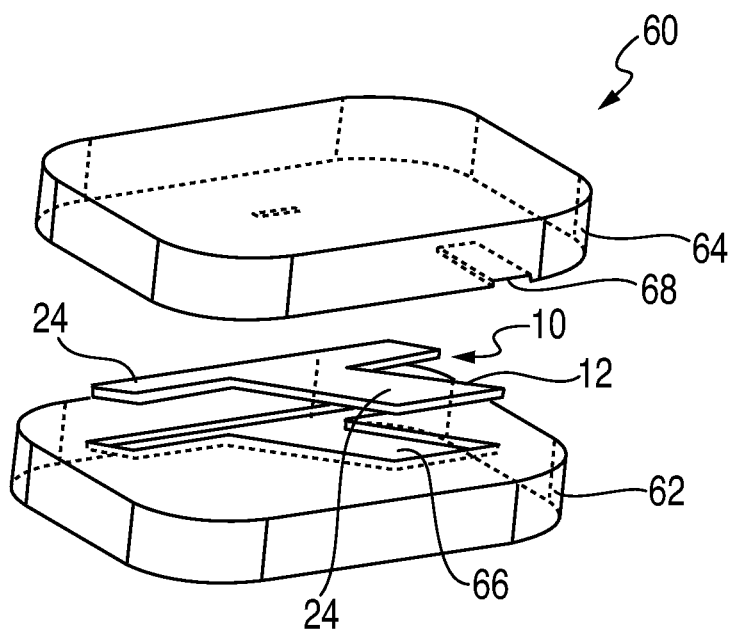
FIG. 20 is an exploded perspective view of the second mold showing the first portion being inserted prior to the formation of the second portion.

Next, the first portion 12 is inserted into the mold chamber 66 of the opened second mold 60, specifically into the second cavity 62 (FIG. 20). The second mold 60 is pressed together and molten plastic for forming the second portion 14, which is preferably a different type of plastic and/or color from that used to form the first portion 12, is injected through the gate 68. As described above, an important feature of the second mold 60 is that the gate 68 is located in the second core 64 rather than the second cavity 62. This molten plastic flows under pressure through the gate 68 and also through the bleed holes 24 in the first portion 12, so that the second portion 14 is formed in the space 22 and the part 10 is formed from behind. An advantage of this method is that any formation blemishes are found on a rear surface 18 of the first portion 12 or on a rear surface 30 of the second portion 14.

Figure 21:
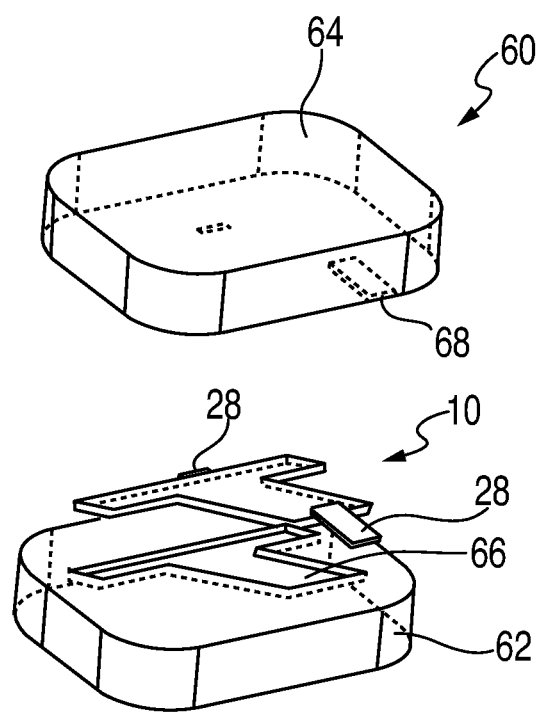
FIG. 21 is an exploded perspective view of the second mold being opened and the finished part being ejected.

Referring now to FIG. 21, the second mold 60 is opened and the part 10 is ejected. Any excess plastic or sprue residue 28 is trimmed, as is known in the molding art.

Referring now to FIGS. 22-24, another embodiment of the part 10 is generally designated 70. Components shared with the part 10 are designated with identical reference numbers. An important feature of the part 70 is that it includes vents 72 (FIG. 23) in the first portion 12. These vents 72 are constructed and arranged to permit flow of plastic material during the molding process beyond a target space or chamber 74 to at least one additional space or chamber 76. It has been found that the use of the additional space 76 provides the resulting part 70 with additional strength, and also prevents separation between the overmolded portion 14 and the base portion 12 Another feature of the present part 70 is that a specific, identified, relatively small-diameter bleed hole 24 is not needed, since the plastic flows directly into the additional cavity 76 instead of a bleed hole. Because of the advantages provided by this construction, it will be understood for the purposes of this application that a bleed hole 24 can be any volume constructed and arranged for receiving the flow of the second plastic into the space 22 defined by the first portion 12.

Referring now to FIGS. 25-27, the part 70 is shown in greater detail, wherein the first portion 12 is shown exploded away from the second portion 14. As described above, the first portion 12 is preferably molded of a different plastic material, and/or has a different color, resiliency or appearance compared to the second portion 14. Also through the use of the vent 72, the second portion 14 has a support portion 78 formed in the additional space 76, such that the support portion, here shown as an "X", provides additional mass and surface area for enhancing adhesion with the first portion 12. As such, the resulting part 70 has greater integrity and is more difficult to separate into components compared to conventional molded parts fabricated using conventional techniques. Accordingly, the resulting part 70 has a longer operational life than prior art parts.

While a particular embodiment of the present multi-portion injection molded part and method for creating same has been shown and described, it will be appreciated by those skilled in the art that changes and modifications may be made thereto without departing from the invention in its broader aspects and as set forth in the following claims.

What is claimed:

1. A plastic injection molded part, comprising:
   a first portion having a front surface and a rear surface, said front surface including at least one border formation extending toward said rear surface and defining a space;
   at least one bleed hole extending from said rear surface to said front surface, said at least one bleed hole being exposed on said front surface and in communication with said space, wherein said at least one bleed hole and said front surface combine to form an outer surface of said first portion; and
   a second portion disposed within said space defined by said at least one border formation and including areas filling said at least one bleed hole, such that when said part is formed, molten plastic forming said second portion enters said space through said at least one bleed hole and completely fills said space, wherein said front surface of said first portion and said second portion combine to form the outer surface of the part.

2. The part of claim 1, further including wherein any formation blemishes are located on said rear surface.

3. The part of claim 1, wherein said at least one border formation retains said second portion within said recessed space.

4. The part of claim 1, wherein said first portion includes at least one vent separating a target space from an additional space, such that plastic forming the second portion flows from the target space to the additional space.

5. The part of claim 1, wherein said space is an open-ended space surrounded by said at least one border formation.

6. The part of claim 1, wherein the second portion is substantially flush with said at least one border formation.

* * * * *